United States Patent
Park et al.

(10) Patent No.: US 11,416,654 B2
(45) Date of Patent: Aug. 16, 2022

(54) ANALYSIS APPARATUS USING LEARNED MODEL AND METHOD THEREFOR

(71) Applicant: DOSAN ENERBILITY CO., LTD., Changwon-si (KR)

(72) Inventors: Jaehyeon Park, Hwaseong-si (KR); Sangjin Lee, Yongin-si (KR); Jeehun Park, Gwangmyeong-si (KR); Hyunsik Kim, Gimpo-si (KR)

(73) Assignee: DOSAN ENERBILITY CO., LTD., Changwon (KR)

( * ) Notice: Subject to any disclaimer, the term of this patent is extended or adjusted under 35 U.S.C. 154(b) by 334 days.

(21) Appl. No.: 16/420,167

(22) Filed: May 23, 2019

(65) Prior Publication Data

US 2020/0065441 A1 Feb. 27, 2020

(30) Foreign Application Priority Data

Aug. 21, 2018 (KR) .................. 10-2018-0097539

(51) Int. Cl.
*G06F 30/20* (2020.01)
*G06F 17/13* (2006.01)
*G06N 7/00* (2006.01)
*G06N 3/08* (2006.01)
*G06N 3/04* (2006.01)
*G06F 111/10* (2020.01)

(52) U.S. Cl.
CPC .............. *G06F 30/20* (2020.01); *G06F 17/13* (2013.01); *G06N 3/0445* (2013.01); *G06N 3/08* (2013.01); *G06N 7/00* (2013.01); *G06F 2111/10* (2020.01)

(58) Field of Classification Search
CPC ...... G06F 30/20; G06F 17/13; G06F 2111/10; G06N 3/0445; G06N 3/006; G06N 3/008

USPC .............................................. 703/6
See application file for complete search history.

(56) References Cited

U.S. PATENT DOCUMENTS

| | | | |
|---|---|---|---|
| 8,725,470 B1 | 5/2014 | Brown et al. | |
| 9,613,186 B2 * | 4/2017 | Fonte | A61B 8/065 |
| 9,785,746 B2 * | 10/2017 | Fonte | G06F 17/11 |
| 10,162,932 B2 * | 12/2018 | Sharma | G16Z 99/00 |
| 2008/0177518 A1 * | 7/2008 | Krishnamoorthy | G06F 30/20 703/9 |
| 2012/0226200 A1 * | 9/2012 | Wagner | A61N 1/36025 607/45 |

(Continued)

FOREIGN PATENT DOCUMENTS

| | | | | |
|---|---|---|---|---|
| AU | 2011283192 A1 * | 2/2013 | ......... | G06F 17/5009 |
| CA | 2792052 A1 * | 9/2011 | ............... | G01V 1/28 |

(Continued)

OTHER PUBLICATIONS

KR_Decision of Grant dated Oct. 28, 2020, No English translation.

(Continued)

*Primary Examiner* — Thai Q Phan
(74) *Attorney, Agent, or Firm* — Harvest IP Law

(57) ABSTRACT

An analysis apparatus is provided. The analysis apparatus includes a model deriver configured to generate an analytic model for predicting a result of a numerical analysis performed multiple times iterations for a component by using a plurality of analytic data used for the numerical analysis for the component, and a model analyzer configured to predict the result of the numerical analysis performed multiple times iterations for a design target component by using the analytic model.

9 Claims, 11 Drawing Sheets

(56) References Cited

U.S. PATENT DOCUMENTS

| | | | |
|---|---|---|---|
| 2013/0066568 A1 | 3/2013 | Alonso | |
| 2013/0132054 A1* | 5/2013 | Sharma | G16Z 99/00 703/9 |
| 2013/0192388 A1* | 8/2013 | Kono | G01F 5/00 73/861.47 |
| 2014/0109691 A1* | 4/2014 | Kono | G01F 1/383 73/861.47 |
| 2015/0142396 A1* | 5/2015 | Lagache | G06F 30/23 703/2 |
| 2015/0324545 A1* | 11/2015 | Fonte | G16Z 99/00 703/2 |
| 2016/0015516 A1* | 1/2016 | Bernstein | A61F 2/2475 623/1.15 |
| 2017/0220760 A1* | 8/2017 | Fonte | G06T 19/00 |
| 2019/0216605 A1* | 7/2019 | Bernstein | A61F 2/2418 |
| 2019/0324438 A1* | 10/2019 | Cella | G05B 23/0264 |
| 2019/0324441 A1* | 10/2019 | Cella | G06N 5/046 |

FOREIGN PATENT DOCUMENTS

| | | | |
|---|---|---|---|
| CA | 2805446 A1 * | 2/2012 | E21B 41/00 |
| JP | 2001-229407 A | 8/2001 | |
| KR | 10-0948755 B1 | 3/2010 | |
| KR | 10-2014-0087653 A | 7/2014 | |
| KR | 10 2014 0140279 A | 12/2014 | |
| KR | 10 2015 0054245 A | 5/2015 | |
| KR | 10-2016-0007838 A | 1/2016 | |
| KR | 10-1612506 B1 | 4/2016 | |
| WO | WO-2021094920 A1 * | 5/2021 | G06F 17/16 |

OTHER PUBLICATIONS

A Korean Office Action dated Mar. 29, 2019 in connection with Korean Patent Application No. 10-2018-0097539 which corresponds to the above-referenced U.S. application, no English translation.

* cited by examiner

ANALYSIS APPARATUS USING LEARNED MODEL AND METHOD THEREFOR

CROSS-REFERENCE TO RELATED APPLICATION

This application claims priority to Korean Patent Application No. 10-2018-0097539, filed on Aug. 21, 2018, the disclosure of which is incorporated by reference herein in its entirety.

BACKGROUND

Field

Apparatuses and methods consistent with exemplary embodiments relate to an analysis technology, and more particularly, to an apparatus for optimizing analysis using a learned model and a method therefor.

Description of the Related Art

To manufacture high performance/high reliability core components, analysis such as computational fluid analysis/ structural analysis/electromagnetic analysis is essential in the design procedure. For example, in the case of a turbine blade, the computational fluid analysis and the structural analysis are required, and in the case of a motor, the electromagnetic analysis is required. However, the conventional analysis methods based on physics are time consuming. Therefore, the analysis conditions are simplified to shorten the analysis time, but in this case, it does not become the sophisticated design. In addition, the analysis is not done only once but should be iterated until proper performance comes out. As a result, it needs a long time to develop the component. Therefore, to shorten the time required for developing the component even while performing the sophisticated design, an analysis method capable of minimizing the analysis time is needed.

SUMMARY

Aspects of one or more exemplary embodiments provide an analysis apparatus capable of shortening the analysis time for component design and a method therefor.

Additional aspects will be set forth in part in the description which follows and, in part, will become apparent from the description, or may be learned by practice of the exemplary embodiments.

According to an aspect of an exemplary embodiment, there is provided an analysis apparatus including: a model deriver configured to generate an analytic model for predicting a result of a numerical analysis performed multiple times iterations for a component by using a plurality of analytic data used for the numerical analysis for the component, and a model analyzer configured to predict the result of the numerical analysis performed multiple times iterations for a design target component by using the analytic model.

The model deriver may include an analytic data storage configured to store the analytic data including a plurality of input signals used for the numerical analysis and a plurality of output signals corresponding to each of the plurality of input signals, and an analytic model deriver configured to generate the analytic model for deriving the output signal of the numerical analysis performed multiple times iterations through the analytic data.

The analytic model deriver constitutes a relationship equation of the analytic model where a parameter is not determined, and generates the analytic model by deriving the parameter through learning by using the analytic data.

The model deriver further includes a processor configured to perform preprocessing for correcting or removing the analytic data according to a predetermined condition.

The model deriver further includes a data analyzer configured to derive a relationship between cells and a relationship between data in each cell by analyzing the preprocessed analytic data.

The model analyzer may include a numerical analyzer configured to derive analytic data by performing the numerical analysis for a plurality of cells that divide the space around the design target component, and an analyzer configured to predict an output signal of the numerical analysis performed multiple times iterations by applying the analytic data to the analytic model derived from the analytic model deriver.

The analysis apparatus further includes an optimizer configured to derive an optimized result that optimizes the plurality of output signals derived from the model analyzer.

The optimizer may include a filter configured to remove noise in each of the plurality of output signals, a primary optimizer configured to optimize the output signal from which the noise has been removed primarily, and a secondary optimizer configured to optimize the primarily optimized result secondarily.

The numerical analyzer outputs the analytic data by iterating the numerical analysis based on the optimized result optimized by the optimizer, and the analyzer predicts the output signal of the numerical analysis performed multiple times iterations by applying the analytic data output according to the iterated numerical analysis to the analytic model derived from the analytic model deriver.

The numerical analyzer outputs the analytic data by iterating the numerical analysis based on the optimized result optimized by the optimizer, and the analytic model deriver updates the analytic model for deriving the output signal of the numerical analysis performed multiple times iterations through the analytic data output according to the iterated numerical analysis.

According to an aspect of another exemplary embodiment, there is provided an analysis apparatus including: a model deriver configured to generate an analytic model for simulating a numerical analysis for a component by using analytic data used for the numerical analysis for the component, and a model analyzer configured to perform the numerical analysis for a design target component by using the analytic model.

The analytic model may include at least one of a parametric model including a Transfer Function model and a State Space model and a nonparametric model.

The analytic model can be a model for simulating the numerical analysis for each of a plurality of cells, a model for simulating the numerical analysis for a cell group including a predetermined number of cells adjacent to each other, a model for simulating the numerical analysis for a cell group including cells having the similar characteristics to each other, or a model for simulating the numerical analysis for all of the plurality of cells, when the periphery of the design target component is divided into the plurality of cells.

The analytic model predicts the result of the numerical analysis performed multiple times iterations.

According to an aspect of another exemplary embodiment, there is provided an analysis method including: generating, by a model deriver, an analytic model for predicting a result of a numerical analysis performed multiple times iterations for a component by using a plurality of analytic data used for the numerical analysis for the component, and predicting, by a model analyzer, the result of the numerical analysis performed multiple times iterations for a design target component by using the analytic model.

The generating the analytic model includes storing, by an analytic data storage, the analytic data including a plurality of input signals used for the numerical analysis and a plurality of output signals corresponding to each of the plurality of input signals, and generating, by an analytic model deriver, the analytic model for deriving the output signal of the numerical analysis performed multiple times iterations through the analytic data.

The generating the analytic model includes constituting, by the analytic model deriver, a relationship equation of the analytic model where a parameter is not determined, and generating, by the analytic model deriver, the analytic model by deriving the parameter through learning by using the analytic data.

The analysis method further includes, before the generating the analytic model, performing, by a preprocessor, preprocessing for correcting or removing the analytic data according to a predetermined condition, and deriving, by a data analyzer, the relationship between cells and the relationship between data in each cell by analyzing the learning data.

The predicting the result of the numerical analysis includes deriving, by a numerical analyzer, the analytic data including an input signal and an output signal corresponding to the input signal by performing the numerical analysis, and deriving, by an analyzer, the output signal of the numerical analysis performed multiple times iterations by applying the analytic data to the analytic model derived by the analytic model deriver.

The analysis method further includes, after the deriving the output signal, deriving, by an optimizer, optimization data by optimizing the plurality of output signals derived by the analyzer.

The performing the optimization includes removing, by a filter, noise in each of the plurality of output signals, optimizing, by a primary optimizer, the output signal from which the noise has been removed primarily, and deriving, by a secondary optimizer, optimization data by optimizing the primarily optimized output signal secondarily.

After the deriving the optimization data, the analysis method can iterate the deriving the analytic data, the deriving the output signal, and the deriving the optimization data, if the optimization data does not converge within a predetermined range.

As described above, according to one or more exemplary embodiments, it is possible to shorten the analysis time for component design, thereby shortening the time required for developing the component.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
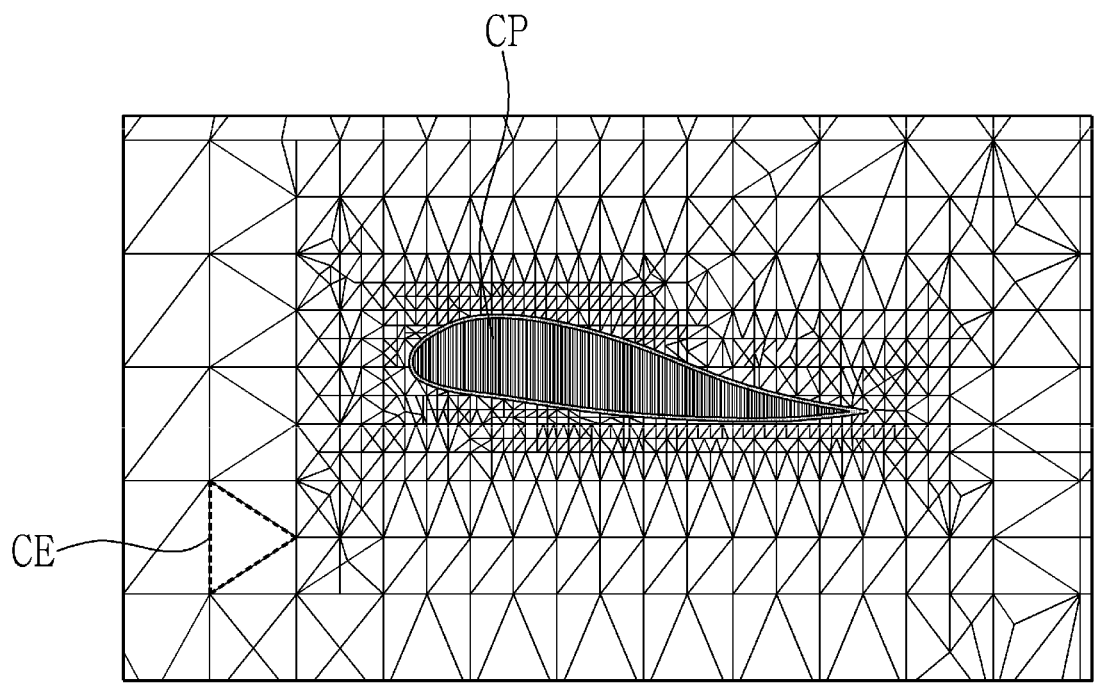
FIG. 1 is a diagram illustrating an example of dividing a design target component and the periphery thereof into a plurality of cells according to an exemplary embodiment.

Hereinafter, various modifications and various embodiments will be described in detail with reference to the accompanying drawings so that those skilled in the art can easily carry out the disclosure. It should be understood, however, that the various embodiments are not for limiting the scope of the disclosure to the specific embodiment, but they should be interpreted to include all modifications, equivalents, and alternatives of the embodiments included within the spirit and scope disclosed herein. In order to clearly illustrate the disclosure in the drawings, some of the elements that are not essential to the complete understanding of the disclosure may be omitted, and like reference numerals refer to like elements throughout the specification The terminology used in the disclosure is for the purpose of describing specific embodiments only and is not intended to limit the scope of the disclosure. The singular expressions "a", "an", and "the" are intended to include the plural expressions as well unless the context clearly indicates otherwise. In the disclosure, terms such as "comprises," "include," or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Further, terms such as "first," "second," and so on may be used to describe a variety of elements, but the elements should not be limited by these terms. The terms are used simply to distinguish one element from other elements. The use of such ordinal numbers should not be construed as limiting the meaning of the term. For example, the components associated with such an ordinal number should not be limited in the order of use, placement order, or the like. If necessary, each ordinal number may be used interchangeably.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

Figure 2:
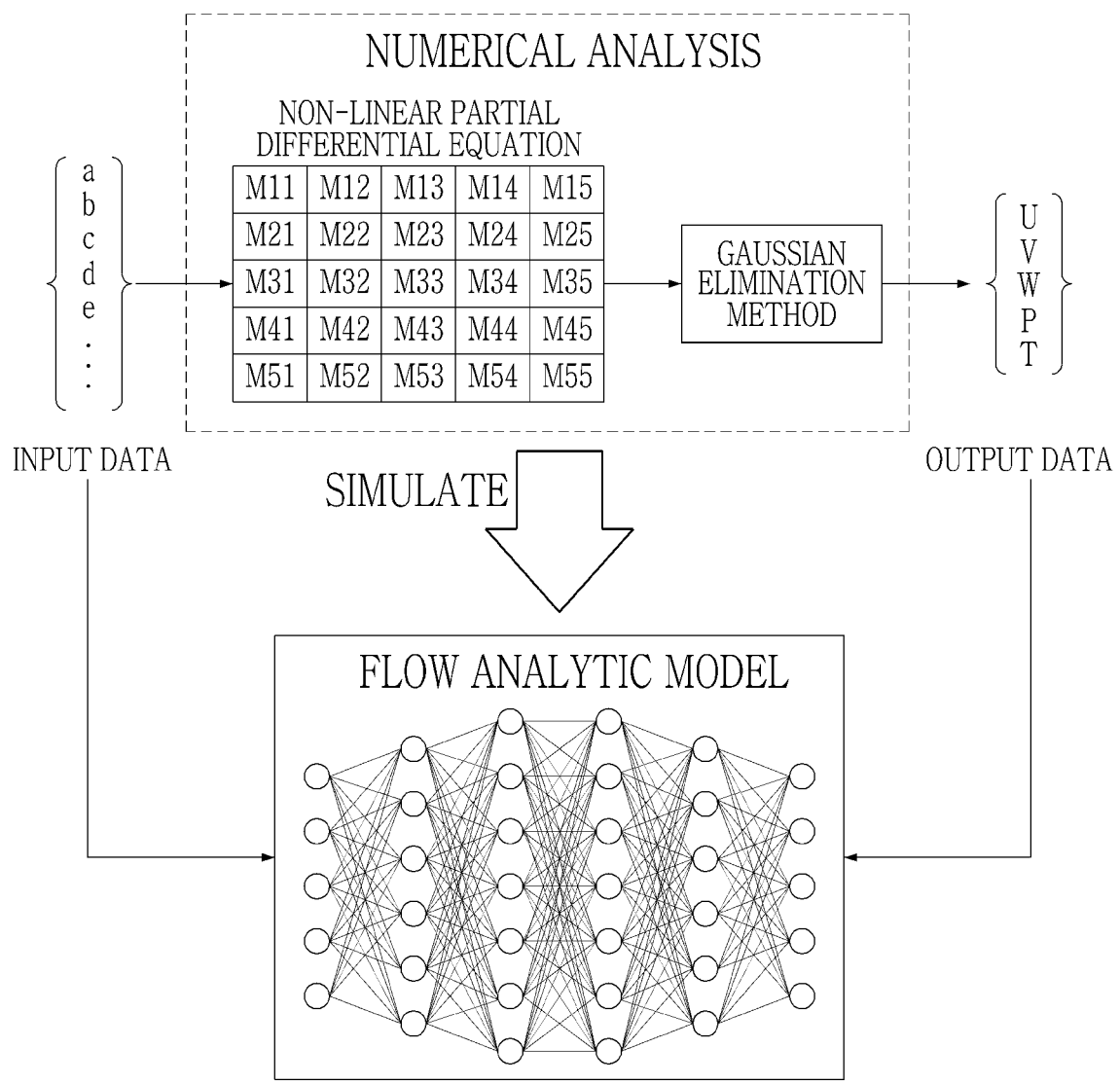
FIG. 2 is a diagram for explaining an analytic model according to an exemplary embodiment.
Figure 3:
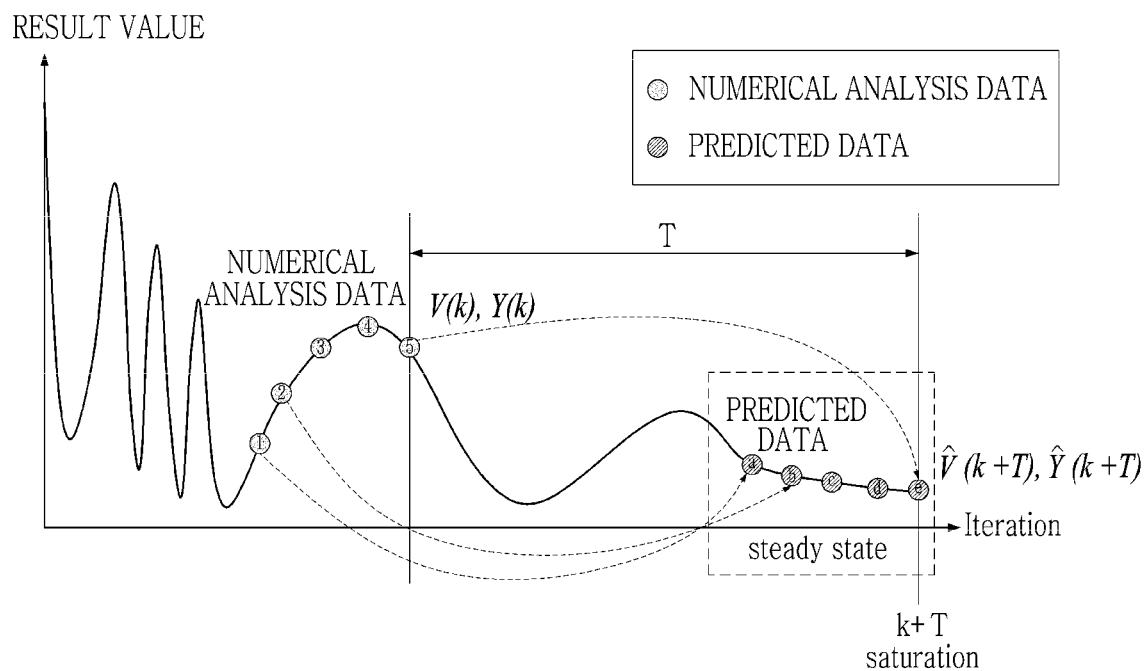
FIG. 3 is a graph for explaining predicted data of the analytic model according to an exemplary embodiment.

First, an analytic model according to an exemplary embodiment will be described. FIG. 1 is a diagram illustrating an example of dividing a design target component and the periphery thereof into a plurality of cells according to an exemplary embodiment. FIG. 2 is a diagram for explaining an analytic model according to an exemplary embodiment. FIG. 3 is a graph for explaining predicted data of the analytic model according to an exemplary embodiment.

Referring to FIG. 1, an analysis can be performed to design a component CP, for example, a component such as a blade of a turbine. This analysis is for dividing an area around the component CP into a plurality of cells CE, and deriving physical properties of each of the plurality of cells CE according to a boundary condition of the plurality of divided cells CE. The analysis can be, for example, a computational fluid analysis, a structural analysis, and an electromagnetic analysis. The analysis can be performed by the numerical analysis through computating operation.

Referring to FIG. 2, the numerical analysis by Computational Fluid Dynamics (CFD) can be performed for the analysis. For the numerical analysis according to Computational Fluid Dynamics, the periphery of the component CP is divided into a plurality of cells CE. Then, a nonlinear partial differential equation for the plurality of cells CE is established. Then, an approximate solution to the partial differential equation can be obtained, for example, by a Gaussian elimination method.

Referring to a graph of FIG. 3, the numerical analysis is performed multiple times iterations due to the characteristics of the fluid. Conceptually, the result value of the numerical analysis of the predetermined number of times at the initial stage is not steady due to the characteristics of the fluid, and it becomes a steady state only after performing multiple times iterations. Therefore, the numerical analysis by Computational Fluid Dynamics is performed multiple times iterations until the fluid around the component becomes in a saturation state. That is, the analysis is for obtaining an output signal of the numerical analysis performed multiple times iterations. The numerical analysis for obtaining the approximate solution to the partial differential equation is time consuming because a parallel processing cannot be performed through computating operation.

Therefore, according to one or more exemplary embodiments, an analytic model is generated to derive an output signal that is the result of the numerical analysis performed multiple times iterations by using the analytic data including a plurality of input signals used for the numerical analysis for component design and a plurality of output signals corresponding to the plurality of input signals. That is, the generated analytical model simulates the result of the numerical analysis performed multiple times iterations. Therefore, it is possible to reduce the time required for obtaining the approximate solution to the partial differential equation, thereby shortening the analysis time. Therefore, it is possible to shorten the time for designing the component.

The analytical model according to an exemplary embodiment may include at least one of a parametric model including a Transfer Function model and a State Space model and a nonparametric model. A Table 1 below illustrates examples of the parametric model and the nonparametric model.

TABLE 1

| Parametric Model | Transfer Function | Equation Error | Auto-Regressive eXogeneous (ARX) Nonlinear Auto-Regressive eXogeneous (NARX) Finite Impulse Response (FIR) Auto-Regressive Moving Average eXogenious (ARMAX): Pseudolinear Regression Model Auto-Regressive (AR) Auto-Regressive Moving Average (ARMA) Auto-Regressive Auto-Regressive eXogeneous (ARARX): Generalized Least-Squares Model Auto-Regressive Auto-Regressive Moving Average eXogeneous (ARARMAX): Extended Matrix Model |
| --- | --- | --- | --- |
| | | Output Error | Output Error (OE) Box and Jenkins (BJ) |
| | State Space | | Linear Time Invariant (LTI), Linear Time Variant (LTV) Linear Model, Nonlinear Model Continuous Time, Discrete Time, Delay Time Single Input Single Output (SISO), Multi Input Multi Output (MIMO) Stochastic Model, Deterministic Model Robust, Open Loop, Closed Loop |
| Non Parametric Model | Non Parametric (Data Set Type) Impulse Response Step Response Frequency Transfer Function Tree Neural Network (NN): FF, FB, Radial Basis Function, Convolutional, Spiking, Deep NN (Deep Belief Network), Recurrent NN | | |

In addition, the analytic model can be derived by using at least one of the optimization algorithms listed in Table 2 below.

TABLE 2

| Parametric Model | Prediction Error Method (PEM) Maximum Likelihood Method (MLM) Least-Squares Method (LSM) Batch Least-Squares Method Off-line Least-Squares Method Extended Least-Squares Method (ELSM) Generalized Least-Squares Method (GLSM) Recursive Least-Squares Method (RLS) Instrumental Variable Method (IVM) Principle Component Analysis (PCA) Dynamic Principle Component Analysis (DPCA) Partial Least Squares (PLS) |
| --- | --- |

TABLE 2-continued

|   |   |
|---|---|
|   | SubSpace-based State Space Model Identification (4SID) Method (+Singular Value Decomposition (SVD)) (+QR Decomposition) N4SID Method Multivariable Output Error State sPace (MOESP) Method Canonical VariateAnalysis (CVA) Singular Value Decomposition Minimal Realization Method (MRM) |
| Non Parametric Model | Transient Response Method Correlation Analysis Frequency Response Method Spectral Analysis Method Empirical Transfer Function Estimate (ETFE) Method Single/Multi-Layer Perceptron Learning, Back-Propagation, Gradient Descent LayerwisePretraining: Auto-Encoder, BolzmannMachine |

In particular, referring back to FIG. 1, the analytic model according to an exemplary embodiment can be a model for simulating the numerical analysis for each of the plurality of cells CE, a model for simulating the numerical analysis for a cell group including the predetermined number of cells CE adjacent to each other, a model for simulating the numerical analysis for a cell group including cells having the similar characteristics to each other, or a model for simulating the numerical analysis for all of the plurality of cells CE, when the periphery of the design target component CP is divided into the plurality of cells CE.

Figure 4:
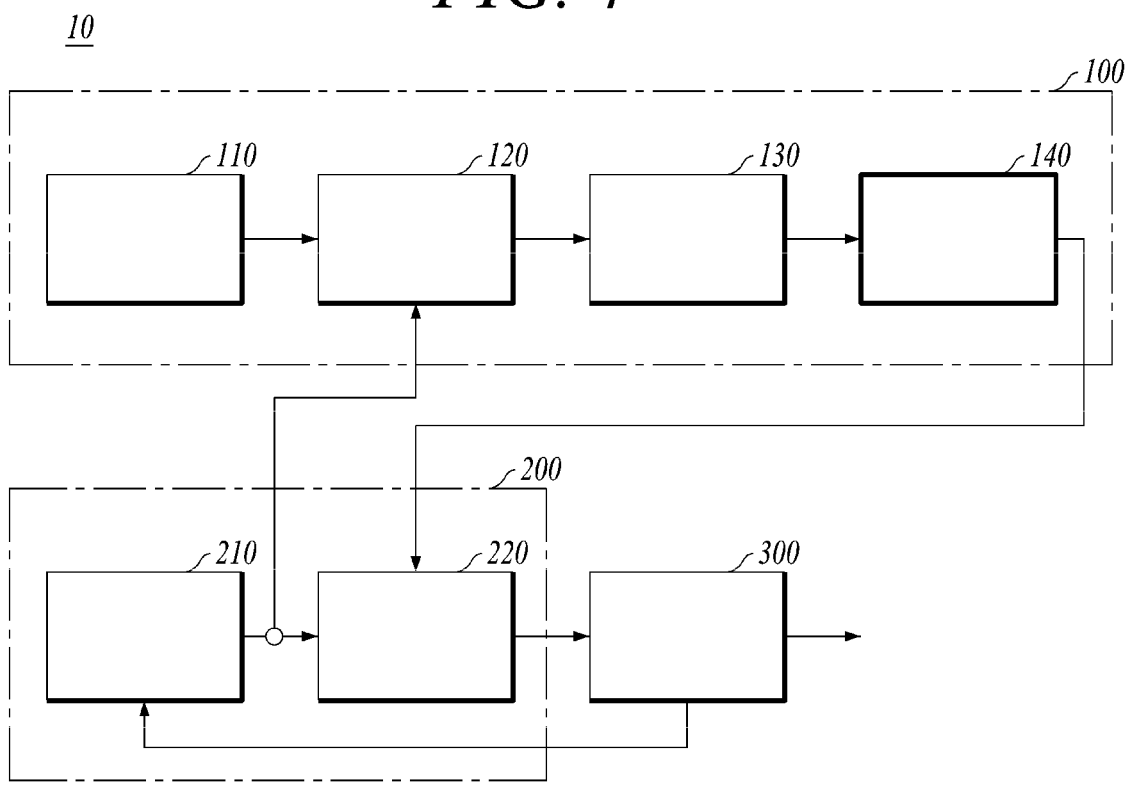
FIGS. 4 and 5 are block diagrams for explaining a configuration of an analysis apparatus according to an exemplary embodiment.
Figure 5:
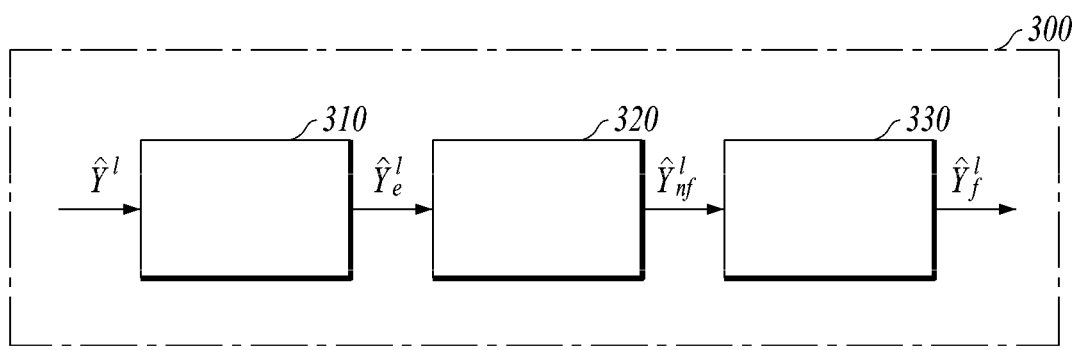

Next, an analysis apparatus according to an exemplary embodiment will be described. FIGS. 4 and 5 are block diagrams for explaining a configuration of an analysis apparatus according to an exemplary embodiment. Referring to FIG. 4, an analysis apparatus 10 according to an exemplary embodiment may include a model deriver 100, a model analyzer 200, and an optimizer 300.

The model deriver 100 generates an analytic model for predicting the result of the numerical analysis performed multiple times iterations for the component by using analytic data that include a plurality of input signals used for the numerical analysis for the component and a plurality of output signals corresponding to the plurality of input signals. The analytic model simulates the result of the numerical analysis performed multiple times iterations. As described above, the analytical model can be composed of a plurality of models, and include at least one of a parametric model and a non-parametric model.

The model deriver 100 may include an analytic data storage 110, a processor 120, a data analyzer 130, and an analytic model deriver 140.

The analytic data storage 110 stores analytic data. The analytic data may be data used for the numerical analysis for a plurality of cells CE that divide the area around the component CP. The analytic data includes a plurality of input signals and a plurality of output signals corresponding to the plurality of input signals. For example, the input signal can be a laminar flow viscosity of the fluid, a turbulent conduction, a time difference between the numerical analysis performed multiple times iterations, etc. in each cell CE. The output signal may be the characteristics of the fluid. For example, the output signal can be a density, a momentum in the x and y directions, an internal energy, etc. in each cell CE.

The processor 120 performs preprocessing for correcting or removing learning data according to a predetermined condition. The preprocessing for the learning data means to remove empty data in the middle, erroneous data, etc. among the learning data, or to convert them into correct numeric values, and to select only the learning data meeting a predetermined requirement. The processor 120 performs preprocessing by correcting or removing the learning data according to a predetermined condition.

The data analyzer 130 derives the relationship between the cells and the relationship between the data in the cell by analyzing the learning data. That is, the data analyzer 130 derives the relationship between the cells CE and the relationship between the data in the cell CE by analyzing the design specification and condition, the relationship between the cells CE, and the data for each cell CE.

The analytic model deriver 140 derives the analytic model for predicting an output signal of the numerical analysis performed multiple times iterations by using the analytic data that include the plurality of input signals used for the numerical analysis and the plurality of output signals corresponding to the plurality of input signals. The analytical model simulates the numerical analysis performed multiple times iterations.

The analytic model deriver 140 constitutes a relationship equation of the analytical model where parameters are not determined, and derives the parameters through an optimization algorithm by putting the analytic data into the relationship equation. Therefore, the analytic model deriver 140 can generate the analytic model by applying the derived parameters to the relationship equation of the analytic model. For example, the analytic model deriver 140 can constitute the relationship equation of the analytical model where the parameters for determining the relationship between the input signal and the output signal of the numerical analysis performed multiple times iterations are unknown, and derive the parameters by learning a plurality of analytic data for the constituted relationship equation. As a result, the analytic model deriver 140 can derive the analytic model.

The model analyzer 200 performs the analysis for the plurality of cells CE that divide the space around the design target component CP by using the analytical model derived from the model deriver 100. The model analyzer 200 may include a numerical analyzer 210 and an analyzer 220.

The numerical analyzer 210 performs the numerical analysis for the plurality of cells that divide the space around the design target component. Therefore, the input signal for the numerical analysis and the output signal corresponding to the input signal are derived. Referring to FIG. 3, in the conventional case, the numerical analysis is performed multiple times (k+T) iterations to obtain a desired result, but in the present disclosure, the numerical analysis is performed only the predetermined number of times k.

The analyzer 220 predicts the output signal of the numerical analysis performed multiple times (k+T) iterations by inputting the analytic data derived from the numerical analyzer 210 to the analytic model generated by the analytic model deriver 140. Referring to FIG. 3, a desired output signal $\hat{Y}(k+T)$ can be obtained only after the numerical analysis is performed multiple times (k+T) iterations. However, according to an exemplary embodiment, because the output signal $\hat{Y}(k+T)$, which is the result of the numerical analysis performed the analytic model multiple times (k+T) iterations, can be obtained from the $k^{th}$ numerical analysis of the numerical analyzer 210, it is not necessary to perform the numerical analysis multiple times T iterations, such that it is possible to shorten the time required for the analysis by the time performed the numerical analysis multiple times T iterations. Therefore, it is possible to shorten the time required for developing the component.

An optimizer 300 is for optimizing the analysis result derived from the model analyzer 200. The analysis result converges to a specific value as the iteration of the numerical analysis is performed. Therefore, it is possible to optimize the result (i.e., the plurality of output signals) predicted by the model analyzer 200 through the optimizer 300. Referring to FIG. 5, the optimizer 300 may include a filter 310, a primary optimizer 320, and a secondary optimizer 330.

The filter 310 is for removing noise of the output signal derived from the model analyzer 200. The filter 310 can use a filter technology to remove noise. The filter can be, for example, at least one of an averaging filter, a moving average filter, a low-pass filter such as an exponentially weighted moving average filter, a high-pass filter, a band-pass filter, and a Kalman filter.

The primary optimizer 320 is for optimizing the output signal that is the result of the analysis of the model analyzer 200 primarily. The primary optimizer 320 outputs a primary optimization value through a primary optimization operation for the plurality of output signals that are outputs of the model analyzer 200. For example, the primary optimizer 320 outputs primary optimization data by calculating the average of the predetermined number of output signals among the plurality of output signals.

The secondary optimizer 330 is for optimizing the result primarily optimized by the primary optimizer 320 secondarily. The secondary optimizer 330 outputs a secondary optimization value through a secondary optimization operation for the plurality of primary optimization data that are outputs of the primary optimizer 320. For example, the secondary optimizer 330 outputs optimum data by calculating the average of the predetermined number of the primary optimization data among the plurality of primary optimization data.

Meanwhile, the optimum data is fed back to the numerical analyzer 210 again, the numerical analyzer 210 again performs the numerical analysis based on the optimum data, and the analyzer 220 can predict an output signal of the numerical analysis performed multiple times iterations according to the analytic model. This procedure is iterated until the output signal predicted by the analyzer 220 converges within a predetermined range.

Meanwhile, when the numerical analyzer 210 outputs the analytic data by iterating the numerical analysis based on the optimum data, the analytic model deriver 140 can update the analytic model for deriving the output signal of the numerical analysis performed multiple times iterations based on the analytic data output by iterating the numerical analysis based on the optimum data. Then, the updated analytic model can be again provided to the analyzer 220.

Figure 6:
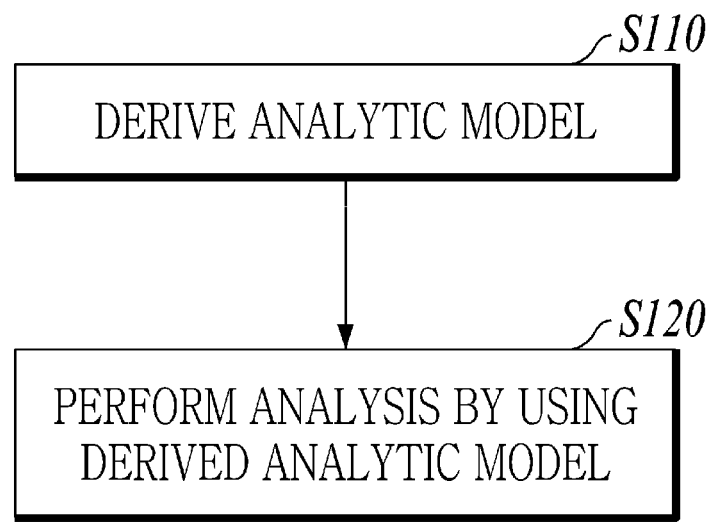
FIG. 6 is a flowchart for explaining an analysis method according to an exemplary embodiment.

Next, an analysis method of the analysis apparatus 10 according to an exemplary embodiment will be described. FIG. 6 is a flowchart for explaining an analysis method according to an exemplary embodiment.

Referring to FIG. 6, the model deriver 100 generates the analytic model for performing the numerical analysis for the plurality of cells CE that divide the space around the target component CP by using the analytic data (operation S110). Herein, the analytic data includes a plurality of input signals used for the numerical analysis performed multiple times iterations and a plurality of output signals corresponding to the plurality of input signals. That is, the analytical model simulates the result of the numerical analysis performed multiple times iterations computationally.

The model analyzer 200 performs the numerical analysis multiple times iterations for the plurality of cells CE in the space around the target component CP through the analytic model derived from the model deriver 100 (operation S120).

The above-described operations S110 and S120 will be described in more detail.

Figure 7:
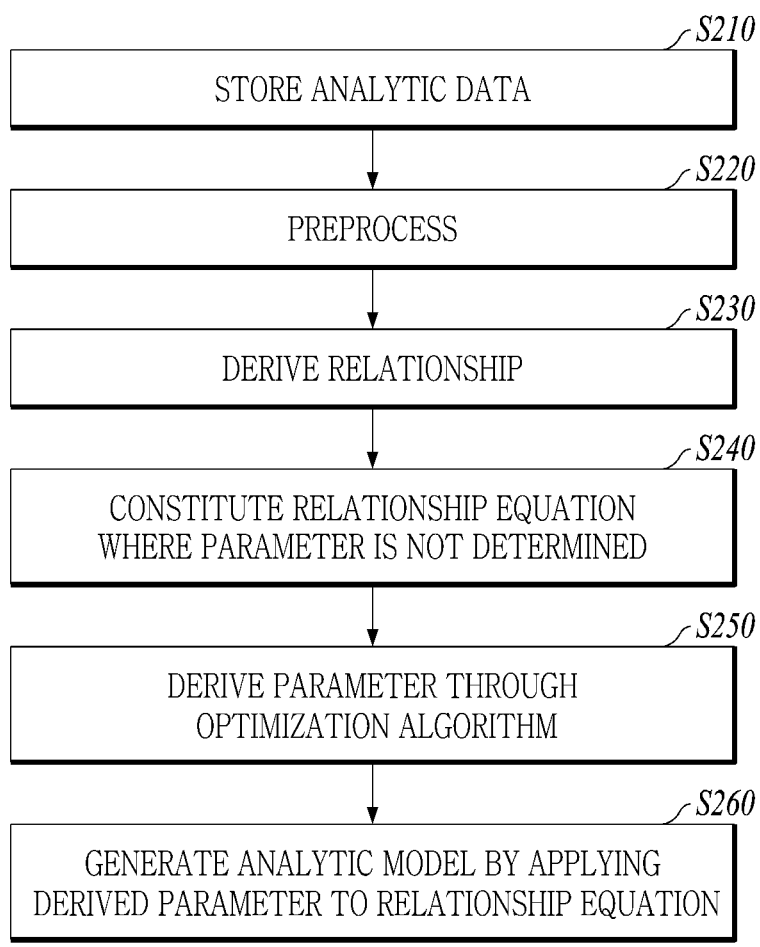
FIG. 7 is a flowchart for explaining a method for generating the analytic model according to an exemplary embodiment.

FIG. 7 is a flowchart for explaining a method for generating an analytic model (in operation S110) according to an exemplary embodiment.

Referring to FIG. 7, the analytic data storage 110 stores the analytic data including the plurality of input signals used for the numerical analysis and the plurality of output signals corresponding to each of the plurality of input signals, and outputs the analytic data (operation S210).

The processor 120 preprocesses the analytic data (operation S220). The processor 120 removes empty data in the middle, erroneous data, etc. among the learning data, or converts them into correct numeric values, and selects and outputs only the analytic data meeting a predetermined requirement. The data analyzer 130 can derive the relationship between the cells CE and the relationship between the data in each cell CE by analyzing the analytic data (operation S230). That is, the data analyzer 130 derives the relationship between the cells CE and the relationship between the data in each cell CE by analyzing the design specification and condition, the relationship between the cells CE, and the data for each cell CE. The above-described operations S220 and S230 can be selectively omitted.

The analytic model deriver 140 constitutes the relationship equation of the analytic model where parameters for determining the relationship between the input signal and the output signal are not determined (operation S240). That is, the analytic model deriver 140 constitutes the relationship equation where the parameters for determining the relationship between the input signal and the output signal of the numerical analysis are unknown. The analytic model deriver 140 derives the parameters through the optimization algorithm by putting the analytic data into the relationship equation (operation S250). That is, the analytic model deriver 140 performs learning for the analytic data through the optimization algorithm. This learning can be, for example, map learning, non-map learning, etc. The analytic model deriver 140 derives the analytic model by applying the derived parameters to the relationship equation (operation S260). This analytical model predicts the output signal of the numerical analysis performed multiple times iterations.

Figure 8:
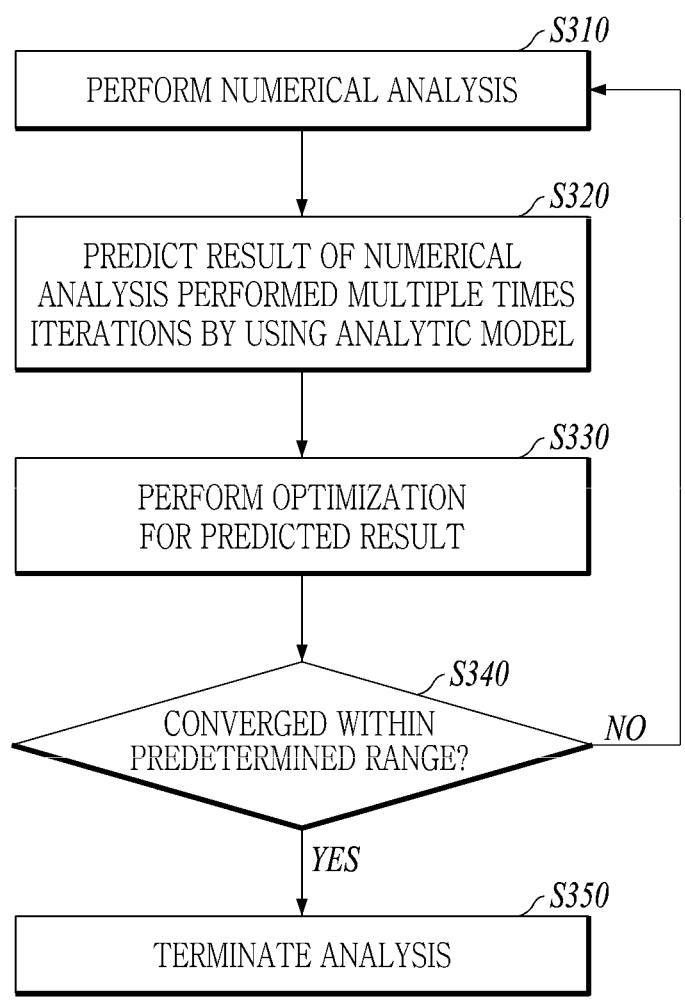
FIG. 8 is a flowchart for explaining a method for performing the analysis according to an exemplary embodiment.
Figure 9:
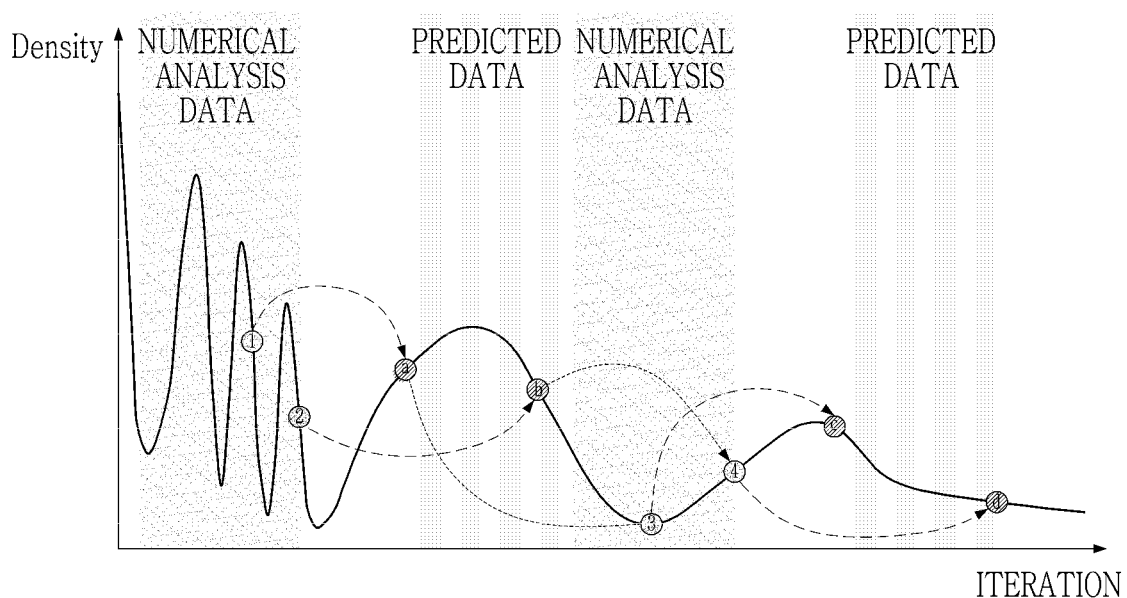
FIG. 9 is a diagram for explaining a method for performing the analysis according to an exemplary embodiment.

Next, a method for performing the analysis by using the above-described analytical model will be described. FIG. 8 is a flowchart for explaining a method for performing the analysis according to an exemplary embodiment. FIG. 9 is a diagram for explaining a method for performing the analysis according to an exemplary embodiment.

Referring to FIGS. 8 and 9, the numerical analyzer 210 of the model analyzer 200 derives the analytic data including the input signal and the output signal by performing the numerical analysis (operation S310). For example, as shown in FIG. 9, the numerical analyzer 210 can derive the first and second analytic data (①, ②).

The analyzer 220 of the model analyzer 200 predicts the output signal (i.e., the predicted data) of the numerical analysis performed multiple times (k+T) iterations by reflecting the analytic data of the numerical analyzer 210 to the analytic model (operation S320). For example, the analyzer 220 can predict the output signals (i.e., the predicted data) (ⓐ, ⓑ) of the numerical analysis performed multiple times (k+T) iterations from the first and second analytic data (①, ②).

The optimizer 300 performs optimization for the plurality of output signals that are the predicted result (operation S330). For example, the average value of the output signals (i.e., the predicted data) (ⓐ, ⓑ) of the numerical analysis can be derived as optimization data.

The optimizer 300 determines whether the optimization data has converged to a predetermined range as a result of the optimization (operation S340). If it does not converge within the predetermined range, the above-described operations S310 to S340 are iterated. If it converges to the predetermined range, the flow advances to operation S350 to terminate the analysis. For example, by repeating the operations S310 to S340, the numerical analyzer 210 has derived the third and fourth analytic data (③, ④) based on the optimum data of optimizing the predicted data (ⓐ, ⓑ), the analyzer 220 has predicted the output signals (i.e., the predicted data) (ⓒ, ⓓ) of the numerical analysis performed multiple times (k+T) iterations from the third and fourth analytic data (③, ④), and the optimizer 300 has calculated the average of the predicted data (ⓒ, ⓓ). At this time, if the value of the optimization data calculated by the optimizer 300 is within the predetermined range, the analysis can be terminated.

Figure 10:
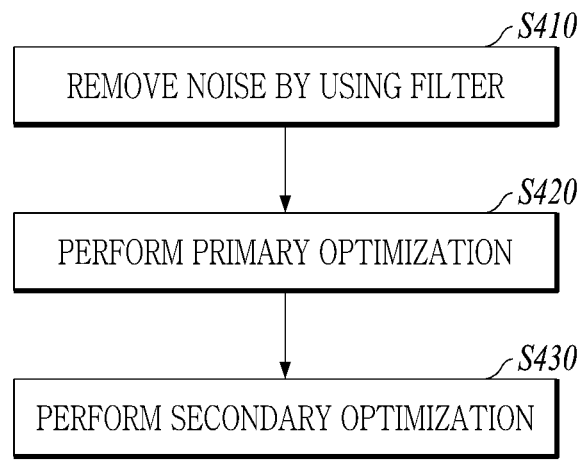
FIG. 10 is a flowchart for explaining a method for optimizing an analyzed result according to an exemplary embodiment.

FIG. 10 is a flowchart for explaining a method for optimizing an analysis result (in operation S130) according to an exemplary embodiment.

Referring to FIG. 10, the filter 310 removes noise in each of the plurality of output signals derived from the model analyzer 200 (operation S410). Herein, the filter can be, for example, at least one of an averaging filter, a moving average filter, a low-pass filter such as an exponentially weighted moving average filter, a high-pass filter, a band-pass filter, and a Kalman filter.

The primary optimizer 320 outputs the primary optimization data by optimizing the plurality of output signals from which the noise has been removed primarily according to a primary optimization operation (operation S420). For example, the primary optimizer 320 can output the average value of the predetermined number of output signals among the plurality of output signals as the primary optimization data through the primary optimization operation.

The secondary optimizer 330 receives a plurality of primary optimization data from the primary optimizer 320, and outputs secondary optimization data by optimizing the plurality of input primary optimization data secondarily (operation S430). For example, the secondary optimizer 330 can output the average value of the predetermined number of the primary optimization data among the plurality of primary optimization data through the secondary optimization operation as the secondary optimization data.

Figure 11:
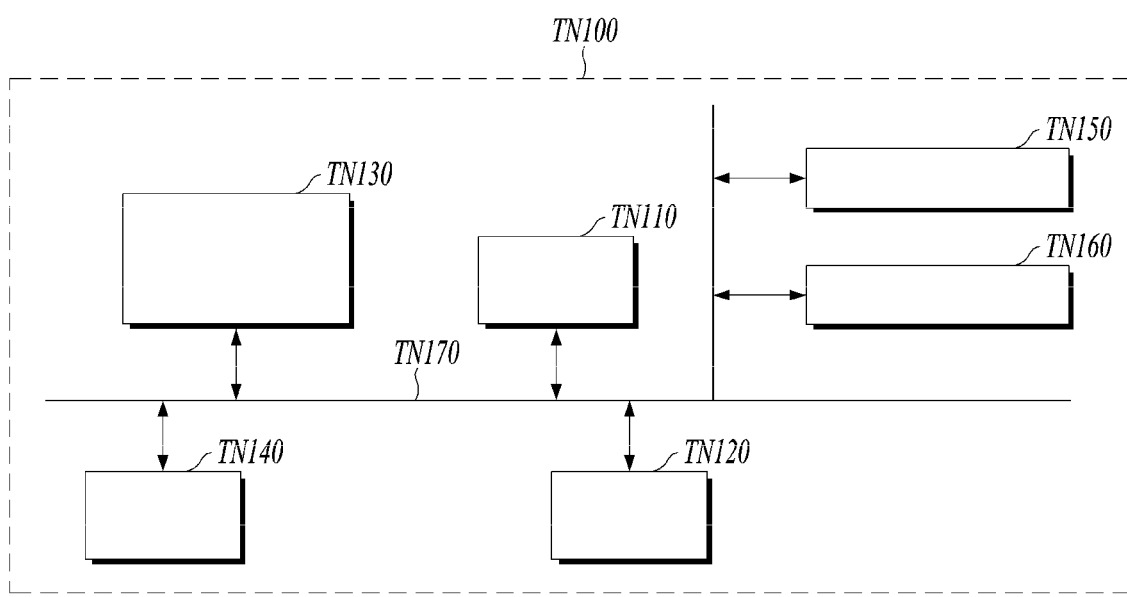
FIG. 11 is a diagram illustrating a computing apparatus according to an exemplary embodiment.

FIG. 11 is a diagram illustrating a computing apparatus according to an exemplary embodiment. A computing apparatus TN100 can be the apparatus described in the present specification (e.g., the analysis apparatus, etc.).

Referring to FIG. 11, the computing apparatus TN100 can include at least one processor TN110, a transceiver TN120, and a memory TN130. In addition, the computing apparatus TN100 can further include a storage device TN140, an input interface TN150, and an output interface TN160. The components included in the computing apparatus TN100 can be connected by a bus TN170 and communicate with each other.

The processor TN110 can execute a program command stored in at least one of the memory TN130 and the storage device TN140. The processor TN110 can include a central processing unit (CPU), a graphics processing unit (GPU), or a dedicated processor on which the methods according to an exemplary embodiment are performed. The processor TN110 can be configured to implement the procedures, functions, methods, etc. described in connection with an exemplary embodiment. The processor TN110 can control each component of the computing apparatus TN100.

Each of the memory TN130 and the storage device TN140 can store various information related to an operation of the processor TN110. Each of the memory TN130 and the storage device TN140 can be composed of at least one of a volatile storage medium and a nonvolatile storage medium. For example, the memory TN130 can be composed of at least one of a read only memory (ROM) and a random access memory (RAM).

The transceiver TN120 can transmit and/or receive a wired signal or a wireless signal. The transceiver TN120 can be connected to a network to perform communication.

Meanwhile, various methods according to an exemplary embodiment described above can be implemented in the form of a readable program through various computer means and recorded in a computer-readable recording medium. Herein, the recording medium can include program commands, data files, data structures, etc. alone or in combination thereof. The program commands to be recorded on the recording medium can be those specially designed and constructed for the present disclosure or can also be those known and available to those skilled in the art of computer software. For example, the recording medium can be magnetic media such as hard disks, floppy disks, and magnetic tapes, optical media such as CD-ROMs and DVDs, magneto-optical media such as floptical disks, and hardware devices specially configured to store and execute the program commands such as ROMs, RAMs, and flash memory. Examples of the program commands can include not only machine language wires such as those produced by a compiler but also high-level language wires that can be executed by a computer by using an interpreter, etc. This hardware device can be configured to operate as one or more software modules in order to perform the operation of the present disclosure, and vice versa.

While one or more exemplary embodiments have been described with reference to the accompanying drawings, it is to be understood by those skilled in the art that various modifications and changes in form and details can be made therein without departing from the spirit and scope as defined by the appended claims. Therefore, the description of the exemplary embodiments should be construed in a descriptive sense only and not to limit the scope of the claims, and many alternatives, modifications, and variations will be apparent to those skilled in the art.

What is claimed is:

1. An apparatus for shortening computing time for analyzing a fluidic performance of a turbine component by reducing a number of a numerical analysis of Computational Fluid Dynamics (CFD) using a neural network, the apparatus comprising:
a model deriving circuitry configured to:
store a first analytic data comprising input signals for a plurality of cells that divide a space around the turbine component and output signals generated by inputting the input signals to the numerical analysis of CFD, wherein the input signals including a laminar flow viscosity, a turbulent conduction, or a time difference between the numerical analysis of CFD performed multiple times and the output signals including a density, a momentum, or an internal energy are generated for each of a plurality of numerical analysis of CFD performed iteratively; and generate the neural network by learning parameters of the neural network through Backpropagation algorithm by putting the first analytic data into a relationship equation of the neural network, wherein the relationship equation determines the relationship between the input signals and the output signals of the numerical analysis of CFD performed iteratively;

a model analysis circuitry configured to:

generate a $k^{th}$ output signal of a target turbine component by performing the numerical analysis of CFD k times for the target turbine component based on a second analytic data for the target turbine component; and predict a $(k+T)^{th}$ output signal of the target turbine component using the neural network based on the $k^{th}$ output signal; and an optimizing circuitry configured to:

generate optimum data based on the $(k+T)^{th}$ output signal, update the $k^{th}$ output signal based on the optimum data, and update the $(k+T)^{th}$ output signal based on the updated $k^{th}$ output signal; and update the parameters of the neural network based on the updated $k^{th}$ output signal and the updated $(k+T)^{th}$ output signal if the optimum data are greater than a predefined range.

2. The analysis apparatus of claim 1, wherein the model deriving circuitry further comprises a processor configured to perform preprocessing for correcting or removing the analytic data according to a predetermined condition.

3. The analysis apparatus of claim 2, wherein the model deriving circuitry further comprises a data analysis circuitry configured to derive a relationship between the plurality of cells that divide the space around the turbine component and a relationship between data in each of the plurality of cells that divide the space around the turbine component by analyzing the preprocessed analytic data.

4. The analysis apparatus of claim 1, wherein the optimizing circuitry comprises:

a filter configured to remove noise in the $(k+T)^{th}$ output signal;

a primary optimizing circuitry configured to optimize the $(k+T)^{th}$ output signal from which the noise has been removed primarily; and a secondary optimizing circuitry configured to optimize the primarily optimized result secondarily.

5. The analysis apparatus of claim 4, wherein the model analysis circuitry outputs the $k^{th}$ output signal of the target turbine component by iterating the numerical analysis of CFD based on the result optimized by the optimizing circuitry, and wherein the model analysis circuitry predicts the $(k+T)^{th}$ output signal by applying the $k^{th}$ output signal of the target turbine component to the neural network.

6. The analysis apparatus of claim 1, wherein the neural network comprises Deep neural network and Recurrent neural network.

7. The analysis apparatus of claim 1, wherein the neural network is a model for simulating the numerical analysis of CFD for each of the plurality of cells, a model for simulating the numerical analysis of CFD for a cell group comprising a predetermined number of cells adjacent to each other, a model for simulating the numerical analysis of CFD for a cell group comprising cells having the similar characteristics to each other, or a model for simulating the numerical analysis of CFD for all of the plurality of cells, when the periphery of the target component is divided into the plurality of cells.

8. A method for shortening computing time for analyzing a fluidic performance of a turbine component by reducing a number of a numerical analysis of Computational Fluid Dynamics (CFD) using a neural network, the method comprising:

(a) storing, by a model deriving circuitry, a first analytic data comprising input signals for each of a plurality of cells that divide a space around the turbine component and output signals generated by inputting the input signals to the numerical analysis of CFD, wherein the input signals including a laminar flow viscosity, a turbulent conduction, or a time difference between the numerical analysis of CFD performed multiple times and the output signals including a density, a momentum, or an internal energy are generated for each of a plurality of numerical analysis of CFD performed iteratively;

(b) generating, by a model deriving circuitry, the neural network by learning parameters of the neural network through Backpropagation algorithm by putting the first analytic data into a relationship equation of the neural network, wherein the relationship equation determines the relationship between the input signals and the output signals of the numerical analysis of CFD performed iteratively;

(c) generating, by a model analysis circuitry, a $k^{th}$ output signal of a target turbine component by performing the numerical analysis of CFD k times for the target turbine component based on a second analytic data of the target turbine component;

(d) predicting, by a model analysis circuitry, a $(k+T)^{th}$ output signal of the target turbine component using the neural network based on the $k^{th}$ output signal;

(e) generating, by an optimizing circuitry, optimum data based on the $(k+T)^{th}$ output signal;

(f) updating, by an optimizing circuitry, the $k^{th}$ output signal by performing the numerical analysis of CFD the k times based on the optimum data and updating, by an optimizing circuitry, the $(k+T)^{th}$ output signal using the neural network based on the $k^{th}$ output signal;

(g) updating the parameters of the neural network based on the $k^{th}$ output signal and the $(k+T)^{th}$ output signal; and (h) repeating (e)-(g) until the optimum data reaches a predetermined range.

9. The analysis method of claim 8, further comprising:
before the generating the neural network,
performing, by the model deriving circuitry, preprocessing for correcting or removing the analytic data according to a predetermined condition to generate learning data; and deriving, by the model deriving circuitry, a first relationship between the plurality of cells and a second relationship between data in each of the plurality of cells by analyzing the learning data.

* * * * *